Aug. 18, 1925.
A. H. BUETTNER ET AL
1,550,500
AUXILIARY SWITCH FOR AUTOMOBILE LIGHTING SYSTEMS
Filed Nov. 25, 1922
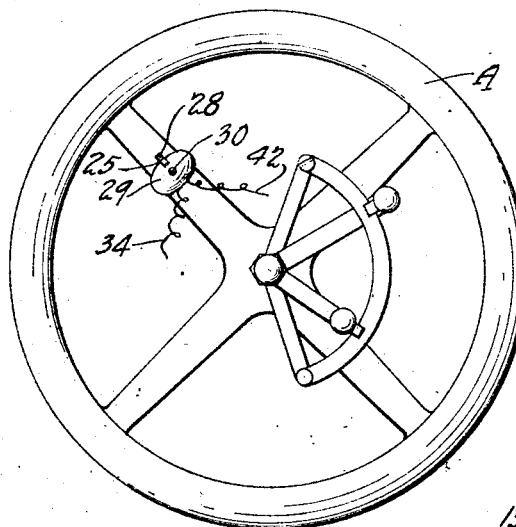
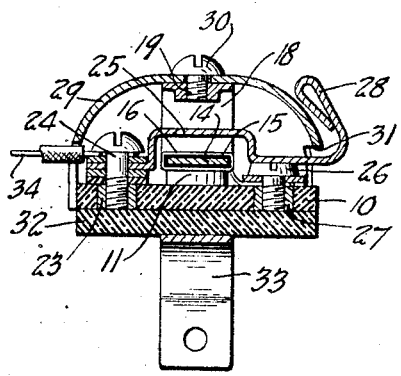
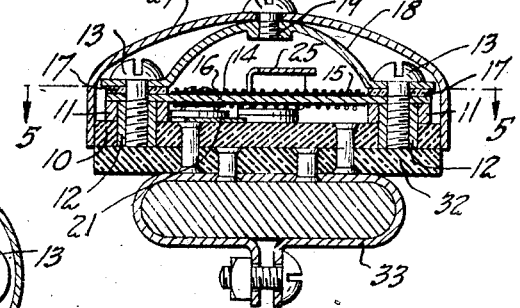
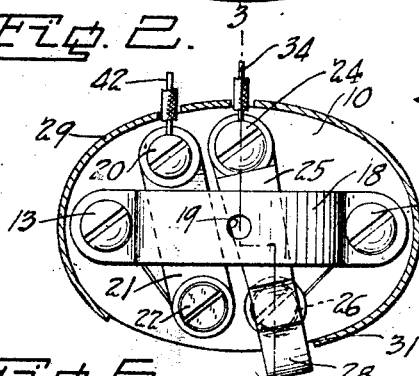
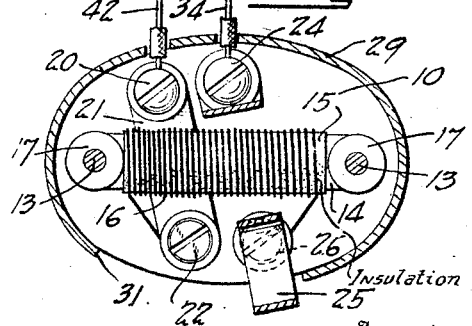
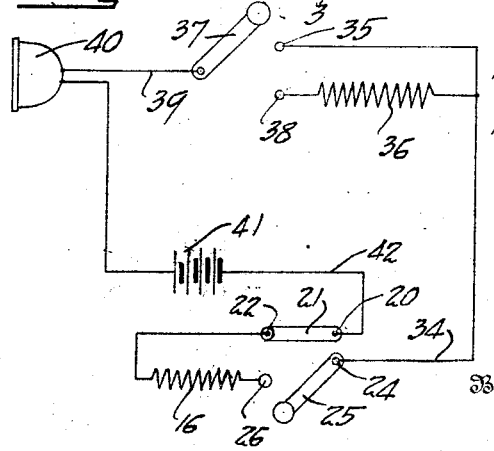
Inventors
A. H. Buettner
H. F. Hoefert
By Watson E. Coleman
Attorney Patented Aug. 18, 1925.

1,550,500

UNITED STATES PATENT OFFICE.

ARTHUR H. BUETTNER AND HAROLD F. HOEFERT, OF ALTON, ILLINOIS.

AUXILIARY SWITCH FOR AUTOMOBILE LIGHTING SYSTEMS.

Application filed November 25, 1922. Serial No. 603,192.

*To all whom it may concern:*

Be it known that we, ARTHUR H. BUETTNER and HAROLD F. HOEFERT, citizens of the United States, residing at Alton, in the county of Madison and State of Illinois, have invented certain new and useful Improvements in Auxiliary Switches for Automobile Lighting Systems, of which the following is a specification, reference being had to the accompanying drawings.

This invention relates to devices for controlling headlights, and particularly to switches for controlling the headlights from the steering wheel of an automobile.

One of the objects of this invention is to provide a very simple and effective switch for this purpose having very few parts and being readily attachable to or detachable from the steering wheel of an automobile, which switch includes as a unit thereof a resistance coil, the switch being adapted to be connected up in circuit with the ordinary dimmer and controlling switch of the headlight so that the headlights may be made bright or dim by operating the auxiliary switch on the steering wheel without the necessity of using the dimmer switch on the instrument board of the machine.

A further object is to provide a construction of this character of extreme simplicity and in which merely two wires lead from the switch to the circuit including the headlights and the usual instrument board switch.

Other objects will appear in the course of the following description.

Our invention is illustrated in the accompanying drawings, wherein:—

Figure 1 is a top plan view of the steering wheel of an automobile with our switch applied thereto;

Figure 2 is a top plan view of the switch, the housing being in section;

Figure 3 is a section on the line 3—3 of Figure 2;

Figure 4 is a longitudinal section through the switch;

Figure 5 is a section on the line 5—5 of Figure 4;

Figure 6 is a diagram of the lighting system of an automobile with our switch applied.

Referring to these drawings, it will be seen that the specific switch which we have devised for this purpose comprises a base 10 of hard fiber, bakelite or other suitable insulating material. This base is preferably somewhat oval in form and at opposite ends of the longer diameter of the base are upwardly extending bosses 11. These bosses 11 have inserted through them interiorly screw-threaded bushings 12 adapted to be engaged by screws 13. Resting at its ends upon these bosses is a metallic strip 14 which between the bosses of the posts is covered with asbestos 15 and around this asbestos is wrapped a resistance wire 16.

Resting upon the extremities of the resistance supporting strip 14 are fiber or rubber washers 17, and disposed between these rubber washers and the heads of the screws 13 is an arched metallic strip 18, the middle portion of which is thickened and interiorly screw-threaded at 19. At one point on the base 10 there is provided a screw 20, and disposed beneath this screw and insulated therefrom is a metallic strip 21 which extends to a binding screw 22 which has screw-threaded engagement with a bushing. One end of the resistance coil extends to this binding screw 22 (see Figure 5), and the upper face of this binding screw 22 is flattened so as to form a contact.

Disposed beside but spaced from the screw 20 is a binding screw 24 also engaged in a bushing 23 which passes through one end of a switch blade 25. This switch blade arches over the resistance unit and is adapted to bear upon the upper face of the binding screw or contact 22. Disposed alongside the binding screw or contact 22 is a binding screw 26 whose upper face is flattened and which extends through a screw-threaded bushing 27, the other end of the resistance wire from the first named end being connected to this binding screw 26. Obviously the switch blade 25 may rest either upon the screw 22 or upon the screw 26. The switch blade is turned upward so as to form a handle 28, and enclosing the switch and forming the housing therefor is a concavo-convex, dish-shaped, metallic cover 29 pierced at its center for the passage of a screw 30 which engages the screw-threaded opening 19. This housing 29 is cut away at 31 to permit the projection of the switch blade 28.

Preferably the fiber base 10 is riveted to a second fiber strip 32 which is provided with suitable clamping means 33 whereby it may be connected to the spider of the steering wheel A.

This switch is connected up as illustrated in the diagrammatic view in Figure 6. The binding post or screw 24 is connected by a wire 34 to the bright light post 35 of the usual switch mounted on the instrument board of the machine. The usual resistance 36 of the dimmer is also connected up in this circuit, the usual switch blade 37 of the instrument board switch being adapted to engage over the contact 35 or the contact 38 for the resistance 36. From the blade 37 the usual wire 39 leads to the headlights 40 and a conductor leads from the headlights to the battery 41, and the battery 41 is connected as, for instance, by the wire 42 to the post 20.

It will be obvious now that when the switch blade 25 is shifted to engage the post 22 that the current will pass through the lamp to the headlight without passing through the resistance wire 16, but that if the switch blade be shifted to engage the contact screw 26 that the current will have to pass through the resistance coil 16 and thus the headlight will be dimmed. Ordinarily the switch blade 37 of the main switch on the instrument board is turned simply into a bright light position and then if it be desired to dim the lights it is only necessary to shift the blade 25 of the auxiliary switch from the contact 22 to the contact 26. If, however, it be desired to park the car and at the same time dim the headlights, then not only may the switch blade 25 be shifted to the contact 26 but the switch blade 37 is shifted to the contact 38 so that the current has to pass through the two resistance coils 36 and 16, thus securing a double diminution of the light for parking so that the light is just one-half as bright as it would be when controlled by the ordinary dimmer. Where the lights are being dimmed upon passing a moving vehicle, in that case of course the light is only dimmed the usual amount. In other words, the switch 37 is already in its bright position or in engagement with the contact 35, while the switch blade 25 is shifted to cut in the resistance 16. It will be seen that only two wires pass from the auxiliary switch, that the device is extremely simple, and that it is applicable to all cars where the light is secured by storage batteries.

It will be seen that there is no change in the ordinary switch on the instrument board used for controlling the lights of the car but that an auxiliary switch is provided mounted upon the steering wheel and controlled thereby and operating in connection with the main switch on the instrument board. It will be seen that the switch has very few parts, that it is very light and cannot readily get out of order, and that it may be connected up in proper circuit without the necessity of skilled workmanship.

We claim:

1. A switch of the character described comprising a non-conducting base, a resistance unit including a resistance coil supported on and in spaced relation to the base, a pair of contacts on the base at one side of the resistance unit and connected respectively to opposite ends of the resistance coil, a pair of binding screws on the base on the opposite side of the resistance coil from the contacts, a metallic member connected at one end to one of said binding posts and extending beneath the resistance unit and connected with one of said contacts, and a switch blade pivoted to the other of said binding posts, arching over the resistance unit and being movable into engagement with either of said contacts.

2. A swith of the character described comprising a non-conducting base, a resistance unit including resistance coils supported on and in spaced relation to the base, a pair of contacts on the base at one side of the resistance unit and connected respectively to opposite ends of the resistance coil, a pair of binding screws on the base on the opposite side of the resistance coil from the contacts, a metallic member connected at one end to one of said binding posts and extending beneath the resistance unit and connected with one of said contacts, a switch blade pivoted to the other of said binding posts, arching over the resistance unit and being movable into engagement with either of said contacts, an arched member operatively supported upon the base and extending over the switch blade, and a housing detachably mounted upon said arched member and covering the base and the binding screws and having an aperture for the projection of the switch blade.

3. A switch of the character described comprising a non-conducting base, a resistance unit including resistance coils supported on and in spaced relation to the base, a pair of contacts on the base at one side of the resistance unit and connected respectively to opposite ends of the resistance coil, a pair of binding screws on the base on the opposite side of the resistance coil from the contacts, a metallic member connected at one end to one of said binding posts and extending beneath the resistance unit and connected with one of said contacts, a switch blade pivoted to the other of said binding posts, arching over the resistance unit and being movable into engagement with either of said contacts, an arched member at its ends resting upon the extremities of the resistance unit, screws extending through the ends of the arched member and through the resistance unit, and a housing detachably mounted upon said arched member and covering the base, binding screws, and enclosing the switch and resistance unit and having an aperture for the projection of the switch blade.

In testimony whereof we hereunto affix our signatures.

ARTHUR H. BUETTNER.
HAROLD F. HOEFERT.